United States Patent [19]

Honda et al.

[11] Patent Number: 5,737,292

[45] Date of Patent: Apr. 7, 1998

[54] OPTICAL DATA RECORDING/ REPRODUCING DEVICE

[75] Inventors: Syuichi Honda, Yokohama; Masaaki Sofue, Hadano, both of Japan

[73] Assignee: Ricoh Company, Ltd., Tokyo, Japan

[21] Appl. No.: 709,237

[22] Filed: Sep. 3, 1996

Related U.S. Application Data

[63] Continuation of Ser. No. 456,286, May 31, 1995, abandoned, which is a continuation of Ser. No. 11,419, Jan. 29, 1996, abandoned.

[30] Foreign Application Priority Data

Feb. 3, 1992 [JP] Japan .................................. 4-017724

[51] Int. Cl.[6] .................................................. G11B 33/14
[52] U.S. Cl. ........................................................ 369/75.1
[58] Field of Search ................................ 369/244, 215, 369/219, 71, 44.12, 44.14, 44.15, 44.16, 75.1

[56] References Cited

U.S. PATENT DOCUMENTS

| | | | |
|---|---|---|---|
| 4,571,715 | 2/1986 | Kato et al. ........................ | 369/44.14 |
| 4,607,913 | 8/1986 | Jansen ............................... | 350/247 |
| 4,912,693 | 3/1990 | Goda .................................. | 369/44.14 |
| 4,958,335 | 9/1990 | Takeda et al. ..................... | 369/44.14 |
| 5,005,162 | 4/1991 | Mitsumori et al. ................ | 369/44.12 |
| 5,023,861 | 6/1991 | Champagne et al. .............. | 369/215 |
| 5,072,436 | 12/1991 | Honda ................................ | 369/44.14 |
| 5,109,368 | 4/1992 | Ohta et al. ......................... | 369/44.14 |
| 5,128,806 | 7/1992 | Ohno .................................. | 359/813 |
| 5,144,607 | 9/1992 | Ishida et al. ....................... | 369/44.15 |
| 5,228,017 | 7/1993 | Matsuzaki et al. ................ | 369/44.15 |
| 5,268,892 | 12/1993 | Tatsuno ............................. | 360/97.02 |

FOREIGN PATENT DOCUMENTS

| | | | |
|---|---|---|---|
| 40631 | 2/1987 | Japan ................................. | 369/44.14 |
| 63-13139 | 1/1988 | Japan . | |

*Primary Examiner*—Stuart S. Levy
*Assistant Examiner*—George J. Letscher
*Attorney, Agent, or Firm*—Cooper & Dunham LLP

[57] ABSTRACT

The present invention relates to an optical data recording/reproducing device wherein an optical system holding portion holding a movable optical system having a carriage and a seek unit, and an emitting/detecting system holding portion holding an emitting/detecting system having an optical pickup unit are formed on the same housing. A number of components are reduced, a strength of the holding portions is improved, and an optical axis of each of systems is regulated with referring to the same housing. Therefore, an accurate assembling can be realized.

10 Claims, 7 Drawing Sheets

OPTICAL DATA RECORDING/ REPRODUCING DEVICE

This is a continuation of application Ser. No. 08/456,286 filed May 31, 1995 now abandoned, which in turn is a continuation of application Ser. No. 08/011,419 filed Jan. 29, 1996 now abandoned.

BACKGROUND OF THE INVENTION

1. Field of the Invention

The present invention relates to an optical data recording/reproducing device which records, reproduces and erases data in an optical data recording medium such as an optical magnetic disc or the like.

2. Description of the Related Art

Japanese Patent Application Laying Open (KOKAI) No. 63-13139 discloses an optical data recording/reproducing device wherein a pickup body and a holding member as an optical source mount are disposed in a frame. The pickup body holds a total internal reflection prism and an object lens which are optical members for irradiating a light spot on a recording face of a disc while moving on the recording face of the disc. The holding member as an optical source mount holds an optical member for guiding a light beam from a light source up to the total internal reflection prism, and for detecting data by a reflective light from the recording face of the disc.

The holding member is movable to the frame, and an optical axis is adjusted by moving the holding member.

In the conventional optical data recording/reproducing device, the holding member as an optical source mount and the frame provided with the pickup body makes the device relatively large. In order to adjust the optical axis by moving relatively the independent holding member and the frame, a large space is required for adjustment in the device. For this reason the device becomes large.

The holding member is fixed to the frame by only three screws. The fixing strength of the holding member to the frame is so small as to exert a bad effect to a control accuracy in tracking and focusing.

At least a bottom of the frame communicates with the exterior. The optical source mount portion is open to the exterior of the device on the pickup body side. Therefore, the conventional device has such a construction as to allow the dust to easily enter the device and easily adhere to various optical members. The adhesion of the dust to the optical members causes deterioration of the characteristics of the optical members.

SUMMARY OF THE INVENTION

It is therefore an object of the present invention to provide an optical data recording/reproducing device which is simply constructed, and exactly and strongly assembled, and prevents dust from adhering to the optical members.

The object of the invention can be achieved by a device comprising an emitting system for emitting a light beam; a movable optical system for irradiating the light beam from the emitting system onto a recording face of an optical data recording medium as a light spot; a detecting system for detecting data by the light beam reflected from the recording face; an emitting/detecting system holding portion holding the emitting system and the detecting system; and an optical system holding portion holding the movable optical system, wherein the emitting/detecting system holding portion and the optical system holding portion are formed on the same housing.

The advantages resulted from the above construction are described hereinafter.

The holding portion for the emitting system and detecting system and the holding portion for the movable optical system are placed on the same housing. Therefore, independent members for holding respective systems become needles 5. So, the number of components are reduced, and the strength of the whole housing is increased. Further, respective systems can be adjusted with reference to the same housing, so that an adjusting range of optical axes and space is reduced, and the device can be minimized.

Preferably, a partition wall may be formed on the housing between the emitting/detecting system holding portion and the optical system holding portion.

The advantages resulted from the above construction are that the partition wall prevents dust from flowing into the moving optical system to the emitting/detecting system and adhering to the optical members of the emitting/detecting system, and that the partition wall strengthens the housing.

Preferably, a through hole penetrating the partition wall may be formed from a bottom face of the housing, the through hole providing an optical path for the light beam.

The advantages resulted from the above construction are described hereinafter.

When the penetration hole is formed from the side face of the housing to provide an optical path for the light beam through the partition wall, another hole is required to reach the partition wall. However, in the present invention, it is not necessary to provide such a hole and to close an unnecessary hole for preventing the dust, accordingly.

Preferably, a plurality of convex portions for reference may be disposed on an opposite face of a face of the housing on which face the emitting/detecting holding system portion and the optical system holding portion are mounted.

The advantages resulted from the above construction are described hereinafter.

The convex portions disposed on the lower bottom face of the housing can be disposed for adjusting reference, machining reference, and assembling reference. Therefore, the accuracy of the adjustment, machining of the housing and an assembling can be improved. Further, the bottom face can be provided with the convex portions in a long distance without affecting other members. As a result, the accuracy of the adjustment, machining and assembling can be ameliorated.

Preferably, components may be fixed to the convex portions by screwing.

The advantage resulted from this construction is that the device constructive member as a board can be fixed by using the convex portions.

Preferably, a plurality of concave portions for positioning may be disposed on an opposite face of the bottom of the housing on which face the emitting/detecting system holding portion, and the optical system holding portion of the housing are mounted.

The advantage resulted from the above construction is that when assembling various members, they are positioned by using the concave portions on the lower bottom face of the housing. Therefore, the assembling accuracy is improved.

Further objects and advantages of the present invention will be apparent from the following description of the preferred embodiments of the invention as illustrated in the accompanying drawings.

DESCRIPTION OF THE PREFERRED EMBODIMENTS

Figure 1:
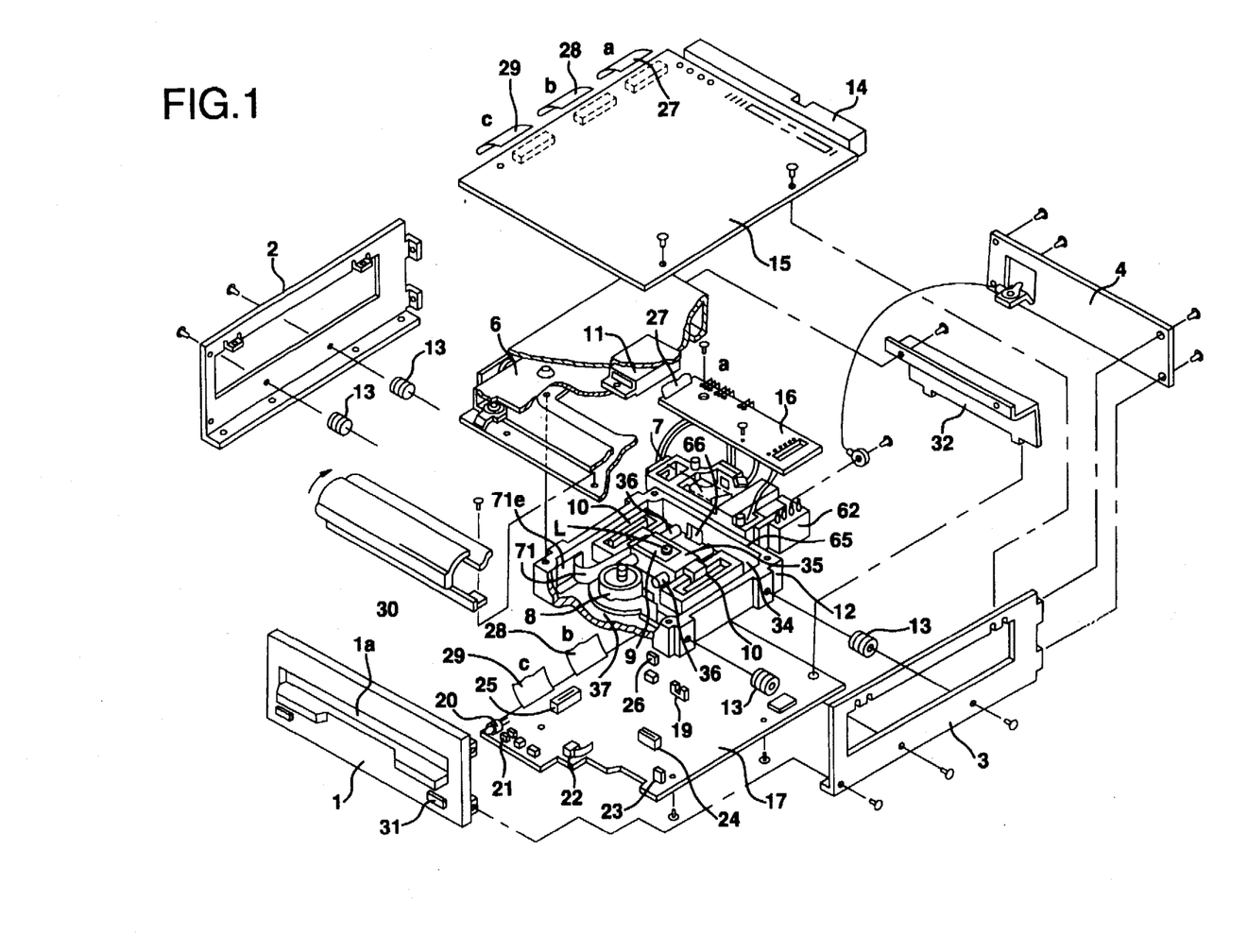
FIG. 1 is an exploded perspective view showing a schematic construction of one embodiment of an optical data recording/reproducing device according to the present invention.

FIG. 1 shows a perspective view showing a schematic construction of one embodiment of the present invention. An outer packaging of the device is formed by a front bezel 1, a right side frame 2 and a left side frame 3 and a rear frame 4. Within the outer packaging of the device, there are disposed a loading unit 6, an optical pickup unit 7, a spindle motor unit 8, a lens actuator unit 9, a pair of seek units 10, and a magnetic head unit 11. The loading unit 6 is adapted to mount an optical magnetic disc (referred to as disc hereinafter) incorporated in a disc cartridge on a spindle motor which will be described hereinafter. The optical pickup unit 7 includes an emitting system provided with an optical member for emitting a light beam onto the disc, and a detecting system provided with an optical member for detecting data by a reflective light from the disc. The spindle motor unit 8 drives rotationally the disc. The lens actuator unit 9 incorporates, an object lens L focusing a light beam emitted from the pickup unit 7 so as to irradiate the disc as a light spot. A pair of seek units 10 include a linear motor for moving the lens actuator unit 9 in a radial direction of the disc. The magnetic head unit 11 is disposed on the loading unit 6 for applying a magnetic field to the disc. These units 6 to 11 are fixed to and supported by the same housing 12.

The housing 12 is screwed to the side frames 2,3 through damping rubbers 13 and is provided with a circuit portion for driving respective unit portions. The circuit portion includes a first board 15 fixed to the side frames 2, 3, a second board 16 fixed to a portion of the housing 12 corresponding to the optical pickup unit 7, and a third board 17 fixed to a bottom of the housing 12. The first board 15 is provided with a connector 14 for receiving an electric power and for delivering a signal to a host computer.

The first board 15 is provided thereon with a controller system circuit for respective portions. The second board 16 is provided thereon with an emitting/detecting system circuit of the optical pickup unit 7. The third board 17 is provided thereon with a home position sensor 19, a light emitting element 20, a sensor 21 for detecting presence or absence of a cartridge 21, a loading switch 22, an eject switch 23, a motor driving circuit connector 24, a seek unit driving circuit connector 25, and a magnetic head driving circuit connector 26, etc. The first cable 27 connects the first board 15 with the second board 16 (a—a). A second and third cable 28 & 29 connect the first board 15 with the third board 17 (b—b, c—c).

In FIG. 1, reference numeral 30 denotes a door unit for opening and closing a cartridge inserting port 1a of the front bezel 1. 31 denotes an eject button mounted on the front bezel 1. 32 denotes a shield plate mounted on the loading unit 6 and the housing 12.

The housing 12 is provided in a central portion thereof with a moving optical system holding portion 34. On the holding portion 34, there are disposed a carriage 35, a pair of guide shafts 36 for guiding the carriage 35, a pair of the seek units 10 for moving the carriage 35 by a magnetic effect. The carriage 35 includes the lens actuator 9 and a polarizing prism not shown in the figure.

Figure 2:
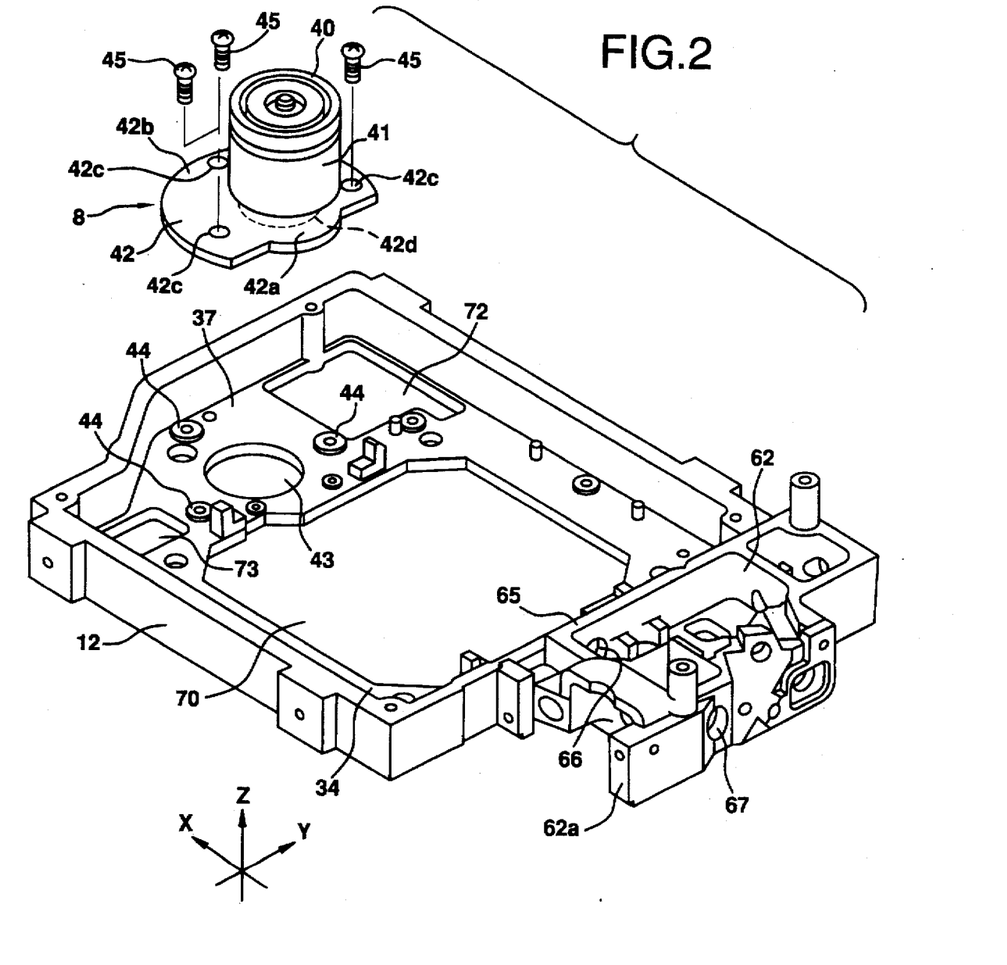
FIG. 2 is a perspective view showing a relation between a housing and a spindle motor unit.

The side portion of the housing 12 adjacent to the moving optical system holding portion 34 in the housing 12 is used as a motor holding portion 37 for holding the spindle motor unit 8. As illustrated in a perspective view of FIG. 2 showing a relation between the housing 12 and the spindle motor unit 8, the spindle motor unit 8 includes a turn table 40, a rotational driving portion 41, and a circular plane portion 42 comprising a small diameter portion 42a, a large diameter portion 42b, and a screw inserting holes 42c. The motor holding portion 37 in the housing 12 is provided with an orifice 43 engaging with a lower protrusion 42d of the driving portion 41, and further provided with projecting portions 44 for positioning, having internal threads at positions corresponding to the three screw inserting holes 42c formed on the circular plane portion 42.

The spindle motor unit 8 is positioned by placing the circular plane portion 42 on projecting portions 44. Then, the screws are inserted into the screw inserting holes 42c and into the internal threads of the projecting portions 44 to thereby fix the spindle motor unit 8 to the housing 12. One portion of the circular plane portion 42 is made into a small diameter portion 42a in order to minimize the housing 12 without preventing a movement of the carriage 35 toward the spindle motor unit 8.

Figure 3:
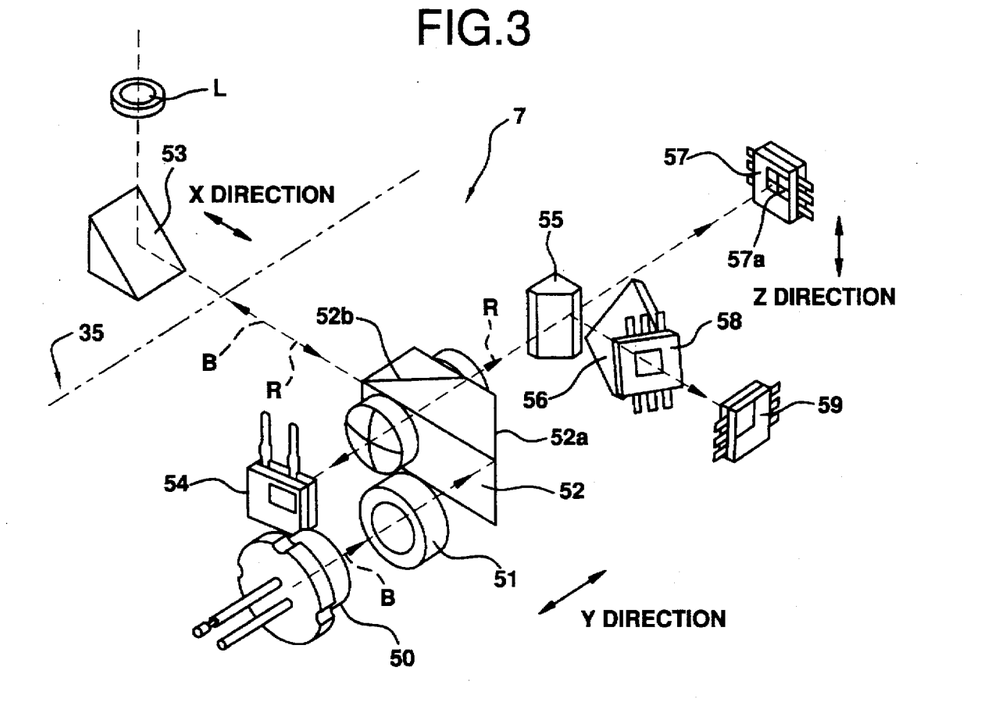
FIG. 3 is a perspective view showing an optical system of an optical pickup unit.

FIG. 3 is a perspective view showing an optical system of the optical pickup unit 7 in FIG. 1. A light beam B emitted from a semiconductor laser (LD) 50 is changed into a parallel beam by a coupling lens (CL) 51 to enter a first polarizing prism (BS) 52. The light beam B which has reflected on a first face 52a of the first BS passes through a second face 52b of the first BS 52. The light beam enters the carriage 35, and reflects on a polarizing prism (DP) 53 within the carriage 35 to be led to an object lens L. The light beam is focused by the object lens L, and irradiated onto a recording face of a disc as a light spot of about 1 µm. The reflective light R on the recording face of the disc passes again through the object lens L, and reflects on DP 53 to enter the first BS 52. The reflective light R reflects on the second face 52b of the first BS 52 as a focused light beam, and is oriented to various photodiodes constructing a detecting system.

In the vicinity of LD 50, there is disposed a semiconductor laser photodiode (LD-PD) 54 for receiving one portion of the light beam B reflected on the second face 52b of the first BS 52 to thereby detect a control signal which enables the light beam B emitted from the LD 50 to be stabilized. The emitting system is constructed by the LD 50, the CL 51, the first BS 52, the LD-PD 54, etc.

The reflective light R reflects on the second face 52b of the first BS 52. One portion of the reflective light R reflects on a knife edge prism (KEP) 55 to be directed to a second BS 56. The reflective light R which has not reflected on the KEP 55 enters a photodiode (FO-PD) 57 for detecting a focusing signal. A light receiving face 57a of the FO-PD 57 is divided (into four in this embodiment). By taking a differential signal in X direction in FIG. 3, a distance signal between the object lens L and the disc (a focusing signal of a light spot) can be detected. One portion of the reflective light R which reflects on the KEP 55 further reflects on the second BS 56. The reflective light R enters a photodiode (MO-PD) 58 for detecting data signal. While the reflective light R which has penetrated into the second BS 56 enters into a photodiode (TR-PD) 59 for detecting a tracking signal, the light receiving face of TR-PD 59 is divided. By taking a differential signal in Z direction in FIG. 3, a positional error signal between the object lens L and a data track on the disk (a tracking signal of a light spot) can be detected.

Figure 4:
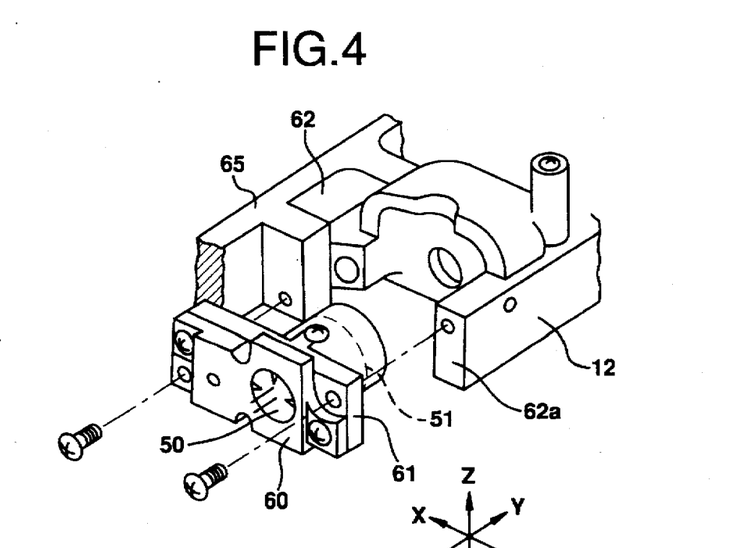
FIG. 4 is a perspective view for explaining a fixing structure of a semiconductor laser.

FIG. 4 is a perspective view for explaining a fixing structure of the LD 50. The LD 50 is fixed by a LD holder 60. The LD holder 60 is provided with a CL cell holder 61 which is relatively movable on a XZ plane. The Cl 51 is fixed to the Cl cell holder 61. An emitting angle of the light beam B emitted from the LD 50 with respect to an optical axis of CL 51 is set by adjusting the position of the LD holder 60 and the CL cell holder 61. After completion of the adjustment, the LD holder 60 is fixed to the Cl holder 61 by screws. The Cl 51 is movable in a direction of the optical axis within the CL cell holder 61 and is adjusted so as to collimate the light beam B passed through the CL 51. After the adjustment, the CL 51 is screwed.

The Cl cell holder 61 is connected to an attaching side portion 62a of the emitting detecting system holding portion 62 so as to be relatively movable in the XZ plane in the same manner as that for the LD holder 60. The portion 62 is unitedly formed adjacently to the moving optical system holding portion 34 in the housing 12 shown in FIGS. 1 & 2. The Cl cell holder 61 is adjusted so as to coincide the optical axis of the optical beam B passing through the object lens L with that of the object lens L. After the adjustment, the CL cell holder 61 is screwed.

Figure 5:
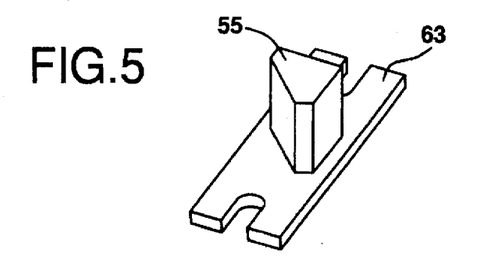
FIG. 5 is a perspective view of a knife edge prism portion.

The first BS 52 and the second BS 56 are attached on the bottom of the emitting/detecting system holding portion 62. As shown in FIG. 5, the KEP 55 is adhered to a KEP holder 63 disposed within the emitting/detecting system holding portion 62. The KEP holder 63 is movable in X direction (FIG. 3) with respect to the housing 12. The KEP holder 63 adjusts a light amount of the reflective light R to be led to each of photodiodes (PD) 57,58,& 59. After the adjustment, the KEP holder 63 is screwed from the lower bottom face of the housing 12.

Figure 6:
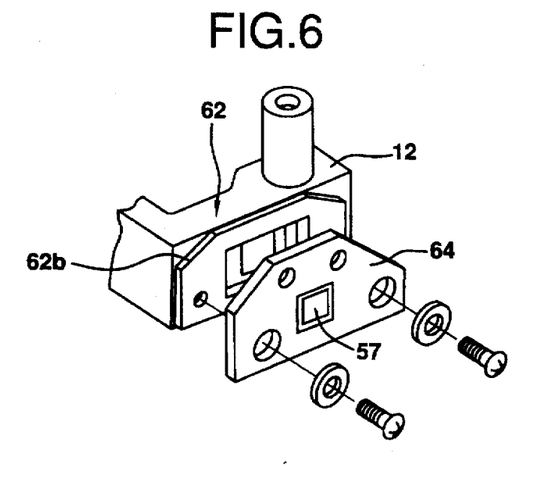
FIG. 6 is a perspective view for explaining a fixing structure of photodiode.

The FO-PD 57 and TR-PD 59 are screwed through a print board 64 to a side portion 62b of the emitting/detecting holding portion 62 of the housing 12, as shown in a perspective view of FIG. 6 for explaining a fixing construction of the FO-PD 57. Also, the MO-PD 58 is fixed to a side portion of the emitting/detecting system holding portion 62 in the same manner, after the adjustment.

As mentioned hereinbefore, a number of optical members are disposed in the emitting/detecting system holding portion 62 within the housing 12. So, when dust produced in the adjacent moving optical system holding portion 34 flows into the emitting/detection system holding portion 62 and adheres to the optical members, optical characteristics of the optical members are deteriorated to thereby exert a bad influence to a detection of a signal. In this embodiment, as shown in FIG. 2, a partition wall 65 is erected between the moving optical system holding portion 34 and the emitting/detecting holding portion 62 within the housing 12 to prevent inflow of the dust to the emitting/detecting system holding portion 62. The partition wall 65 is provided with a through-hole 66 through which the light beam is allowed to deliver between the first BS 52 of the light pick up unit 7 and DP 53 of the carriage 35.

As shown in FIG. 2, a machining hole 67 may be formed in the side wall of the emitting/detecting system holding portion 62 of the housing 12, and a machining means may be inserted through the hole 67 to form the through-hole 66. After the through-hole 66 has been formed, it is required to close an unnecessary machining hole 67 with a filler or a plate.

Figure 7:
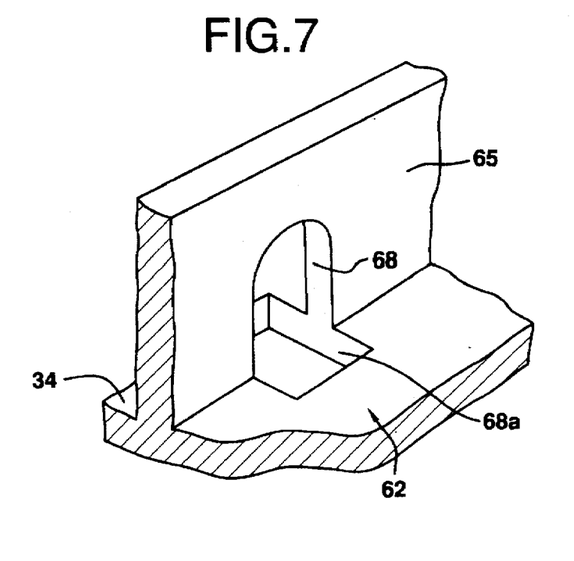
FIG. 7 is a perspective view showing a through-hole of a partition wall.

In this embodiment, as shown in FIG. 7, the formation of the machining hole 67 shown in FIG. 2 is made unnecessary by forming a U-shaped through-hole 68 from the lower bottom face of the housing 12 where the through-hole 66 in the partition wall 65 is to be formed. Generally a lower orifice 68a of the U-shaped hole 68 is closed by a board or the like, to prevent inflow of the dust.

Figure 8A:
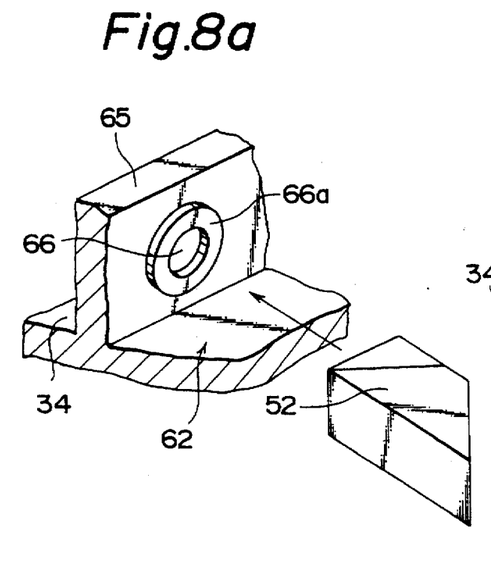
FIG. 8a and FIG. 8b are perspective views showing a closing construction of the through-hole.
Figure 8B:
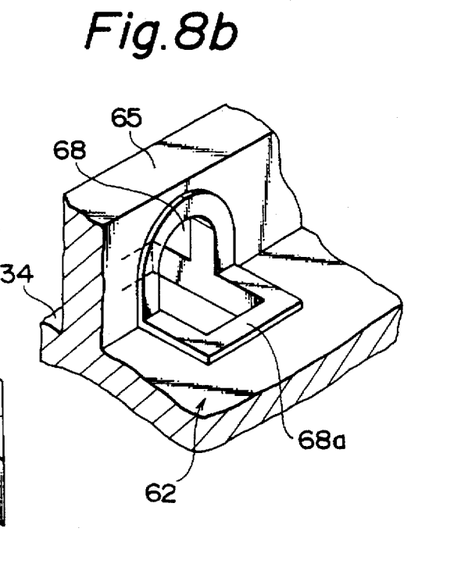

However, there is still inflow of the dust through the through-hole 66 and the U-shaped hole 68. As shown in FIGS. 8a & 8b, an adhesion land face may be formed around the through-hole 66 and the U-shaped hole 68. One side of the first BS 52 of the light pickup unit 7 may be adhered onto the adhesion land face 66a, 68a to close the opening of the hole and prevent the inflow of the dust.

Figure 9:
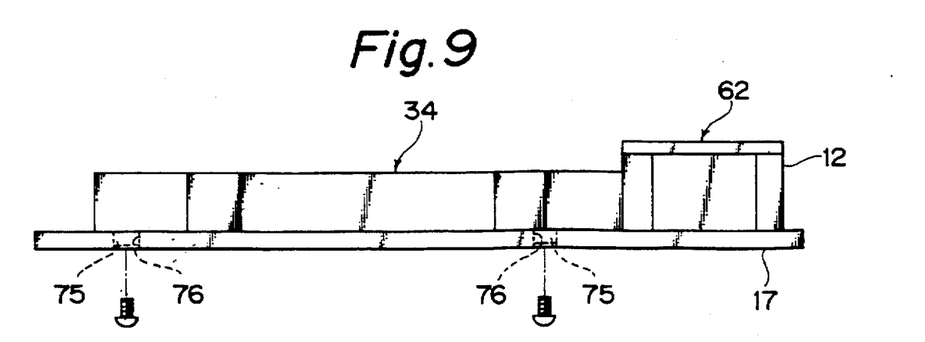
FIG. 9 is a side view showing a relation between a third board and the housing.

The second board 16 and the third board 17 will be explained hereinafter. On the second board 16, one portion of the circuit of the emitting system and the detecting system of the light pickup unit 7 is formed. The second board 16 is fixed onto the emitting/detecting system holding portion 62 of the housing 12 to be electrically connected with respective portions of the light pickup unit 7. As illustrated in FIG. 1 and in the side view of FIG. 9 showing a relation between the third board and the housing 12, the third board 17 is located under the housing 12.

Figure 10:
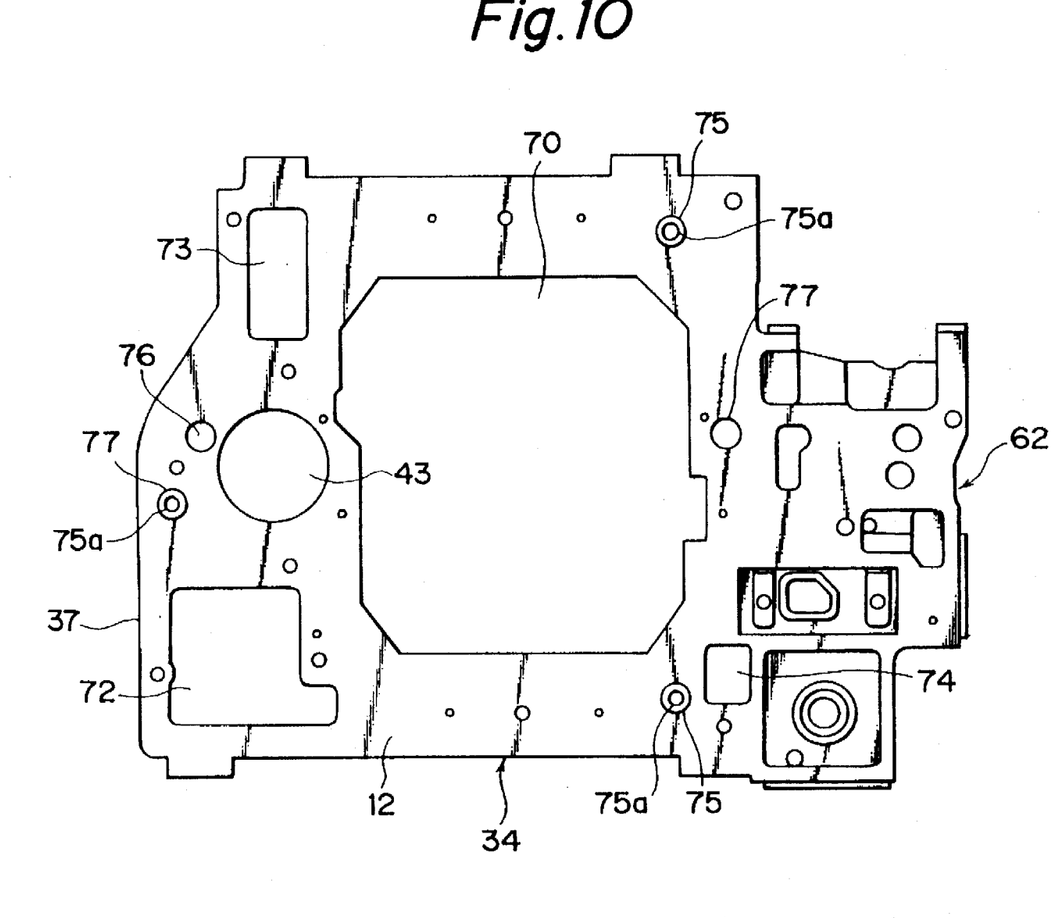
FIG. 10 is a bottom view of the housing.

FIG. 10 is a bottom view of the housing 12. As also shown in FIG. 2, the housing 12 is provided with a window portion 70 for the carriage 35 at the bottom portion thereof. Further, on the bottom portion of the housing 12, there are formed a flexible cable feeding window portion 72 for feeding from the exterior through a seek unit driving circuit connector 25 on the third board 17 to a flexible cable 71 of the seek unit 10 in FIG. 1, a spindle motor feeding window portion 73 for placing the motor driving circuit connector portion 24 on the third board 17, and a magnetic head feeding portion 74 for placing a magnetic head driving circuit connector portion 26. Respective window portions 70, 72,73 & 74 are closed so as to prevent the inflow of the dust by screwing the third board 17 to a lower bottom face of the housing 12. A plurality of convex portions 75 (three portions in the figure) are arranged on the lower bottom face of the housing 12. Respective convex portions 75 form internal threads 75a. After having inserted convex portions 75 into the hole portions 76 formed in the third board 17, the convex portions 75 are screwed as shown in FIG. 9.

As described hereinbefore, the light pickup unit 7 has a plurality of adjusting portions for an adjustment in micrometer unit. For this adjustment, or for an assembling after the adjustment, the pickup unit 7 needs a reference. In the embodiment according to the present invention, the optical pickup unit 7 is fixed on the basis of the lower bottom face of the housing 12, as a reference face. That is, three convex portions 75 of the bottom face of the housing 12 serve as a reference of a Z direction (FIG. 2). The convex portions 75 each forming an internal thread 75a are screwed with high accuracy.

On the lower bottom face of the housing, a plurality of (two in FIG. 10) concave portions 77 for positioning are formed. An accurate adjustment and assembling can be realized by inserting a fitting member like a cylindrical pin for example into the concave portions 77. The lower face of the housing 12 does not relatively affect the other members. The convex portions 75 and the concave portions 77 can be arranged in a long distance, so that the higher accuracy of the adjustment can be obtained in comparison with those placed in a short distance.

Particularly, the convex portions 75 located on the lower bottom face of the housing 12 can be used as a reference face when machining the moving optical system holding portion 34, and the emitting/detecting system holding portion 62. The assembling and the processing can be carried out by using the same reference of the convex portions 75, therfore an assembling accuracy can be further improved.

Figure 11:
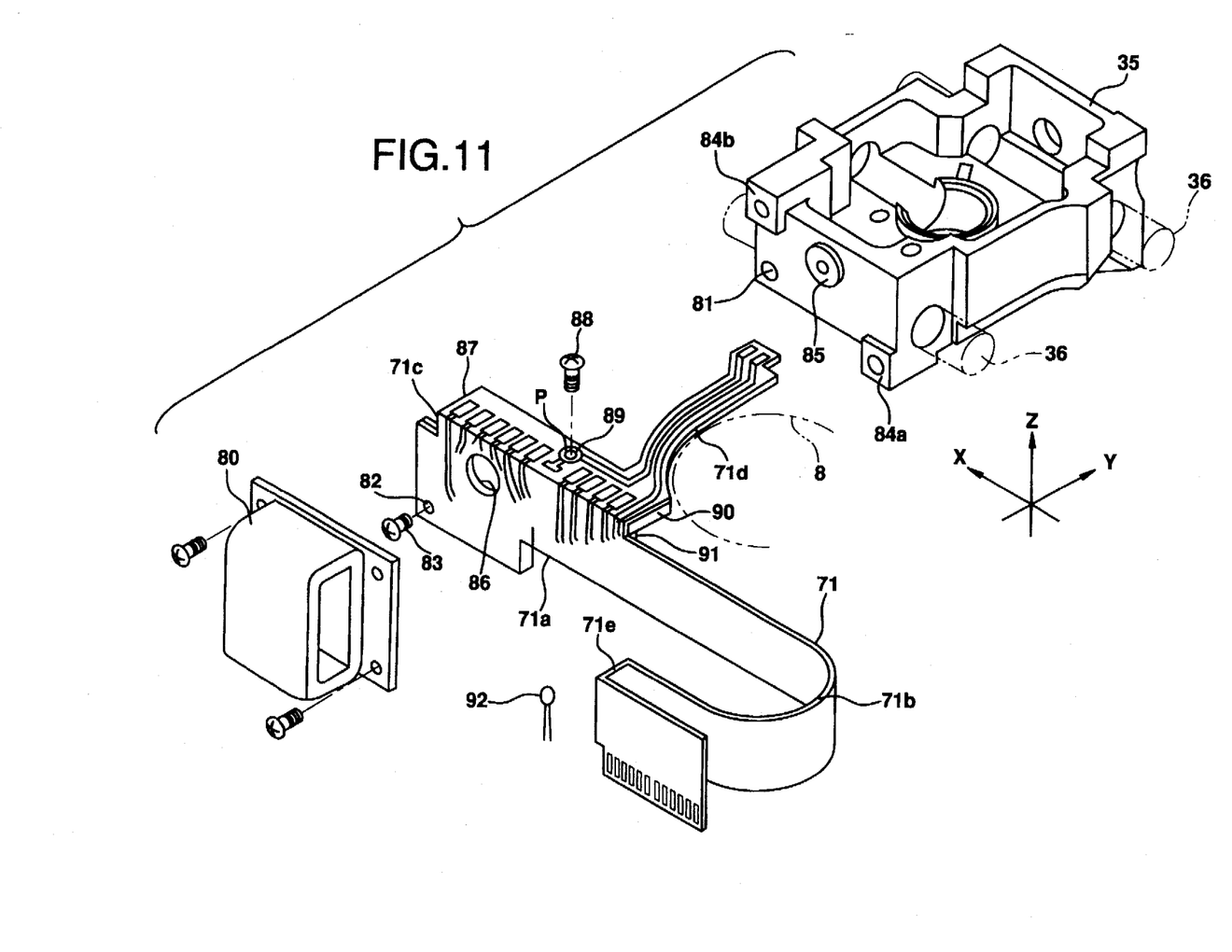
FIG. 11 is an exploded perspective view for explaining fixation of a flexible cable.

FIG. 11 is an exploded perspective view for explaining a fixation of a flexible cable of FIG. 1. The flexible cable 71 feeds to a magnetic coil of the lens actuator unit 9 and to an optical member for detecting a movement error of the object lens L in a tracking direction, as well as to the seek unit 10. The flexible cable 71 is flexible to minimize a load imparted to the movement of the carriage 35 moving in a seek direction. For this reason, the flexible cable 71 is bent approximately in a U shape (71b), when seen from the top.

The flexible cable 71 is disposed between a side portion of the carriage 35 and a seek coil 80 constructing a seek unit 10. The cable 71 is provided in a lower left portion thereof with a connecting screw inserting hole 82 corresponding to an internal thread portion 81 of the carriage 35. A hole diameter of the connecting screw inserting hole 82 is determined to fit with the screw 83, so the flexible cable 71 can be positioned onto the carriage 35. The flexible cable 71 is positioned with respect to a rotating direction around the screw 83 by contacting a lower side 71a of a notch of the flexible cable 71 to an upper side portion of a seek coil mounting convex portion 84a located on a right lower portion of the carriage 35. Thus the bent portion 71b of the flexible cable 71 is positioned in parallel to the moving direction of the carriage 35.

An escape hole 86 is formed on the flexible cable 71 facing a carriage 35 to permit the flexible cable to escape abutting against a bearing pin inserting land 85 on the carriage 35. Also an escape portion 71c is formed on a left upper portion of the flexible cable 71 to permit the flexible cable 71 to escape abutting again the seek coil mounting convex portion 84b disposed on a left upper portion of the carriage 35. A support pin of a bearing (not shown) supporting a guide shaft 36 of the carriage 35 is inserted into a bearing pin inserting land 85. The land 85 has a larger thickness than the frame of the carriage 35 to improve a positioning accuracy of the bearing and a fixing force of the bearing.

A soldering terminal portion 87 for an electrical connection in the flexible cable 71 is placed on an upper face of the carriage 35. The portion 87 is required to be shortened in Y direction due to the presence of the lens actuator 9 in the carriage 35. The portion 87 is bent to the side face of the carriage. The portion 87 is fixed by a screw 88 so as not to float from the upper face of the carriage 35. A screwing hole portion 89 of the flexible cable 71 into which the screw 88 is to be inserted is disposed approximately in a central portion with respect to the X direction of the flexible cable to shorten a flexible cable in X and Y directions and stabilize the screw fixation. The portion 89 is provided on the surrounding thereof with a pattern P to electrically connect with a pair of seek coils (FIG. 11 shows only one of the two seek coils), thereby economizing a space.

An escape side portion 71d is formed on the flexible cable 71 placed on an upper face of the carriage 35 to permit the flexible cable 71 to escape abutting against the spindle motor unit 8. Thus, a moving region of the object lens L can be taken as much as possible to be close to the spindle motor unit 8. Further, in order to improve adhesion between the flexible cable 71 and the carriage 35, backing plates 90,91 are arranged on a back face of the flexible cable 71 of the side upper face and the upper face of the carriage 35.

After completion of the above mentioned assemble, the terminal portion 71e bent in U shape is connected with the seek unit driving circuit connector 25 on the third board 17. A temperature sensor 92 is disposed on a right end portion of the flexible cable 71 on the seek unit driving circuit connector 25.

Many widely different embodiments of the present invention may be constructed without departing from the spirit and scope of the present invention. It should be understood that the present invention is not limited to the specific embodiments described in the specification, except as defined in the appended claims.

What is claimed is:

1. An optical data recording/reproducing device comprising:

a housing defining a movable optical system holding portion, a motor holding portion and a stationary optical system holding portion, said stationary optical system holding portion being isolated from said movable optical system holding portion and said motor holding portion by at least one wall such that dust is inhibited from passing between said movable optical system holding portion and said stationary optical system holding portion;

a movable optical system movably positioned in said movable optical system holding portion, said movable optical system being configured to direct light toward a face of a disc positioned adjacent said movable optical system and to receive light reflected by the face of the disc;

a motor positioned in said movable optical system holding portion and configured to move said movable optical system relative to the disc;

a spindle motor positioned in said motor holding portion for rotating the disc;

a light emitting system mounted in said stationary optical system holding portion, said light emitting system generates a light beam and directs the light beam through an opening in said isolating wall toward said movable optical system, said opening in said isolating wall being a sealed opening configured to permit the light beam to pass therethrough which is sealed by a light directing member mounted in said stationary optical system holding portion and abutting said opening; and a light detecting system mounted in said stationary optical system holding portion, said light detecting system receives a reflected light beam from said movable optical system through said opening in said isolating wall and detects data from the reflected light beam.

2. The optical data recording/reproducing device according to claims 1, wherein said opening in said isolating wall is formed from a bottom face of said housing.

3. The optical data recording/reproducing device according to claim 1, wherein said light directing member is configured to direct light emitted by said light emitting system through said opening toward said movable optical system and to direct reflected light from said movable optical system to said light detecting system.

4. The optical data recording/reproducing device according to claim 3, wherein said light directing member is a polarizing prism.

5. The optical data recording/reproducing device according to claim 1, wherein said movable optical system includes a light directing member that directs light emitted by said light emitting system to an object lens actuator and that directs reflected light from the object lens actuator through said opening in said isolating wall to said light detecting system.

6. The optical data recording/reproducing device according to claim 1 further comprising a guide shaft disposed between said movable optical system holding portion and said stationary optical system holding portion for guiding movement of said movable optical system.

7. The optical data recording/reproducing device according to claim 1, wherein said opening is a circular opening formed in said isolating wall.

8. The optical data recording/reproducing device according to claim 1, wherein said opening is a U-shaped opening formed in said isolating wall.

9. An optical data recording/reproducing device according to claim 1, wherein said optical system holding portion has a linear motor for moving said movable optical system.

10. An optical data recording/reproducing device according to claim 1, wherein said movable optical system is a carriage having a lens actuator and deflection means.

* * * * *

UNITED STATES PATENT AND TRADEMARK OFFICE
CERTIFICATE OF CORRECTION

PATENT NO.  : 5,737,292
DATED       : April 7, 1998
INVENTOR(S) : Syuichi HONDA and Masaaki SOFUE It is certified that error appears in the above-indentified patent and that said Letters Patent is hereby corrected as shown below:

Cover page, item [63], last line, please delete "1996" and insert --1993--

Signed and Sealed this

Sixteenth Day of June, 1998

*Attest:*

BRUCE LEHMAN

*Attesting Officer*          *Commissioner of Patents and Trademarks*